United States Patent [19]
Owada

[11] Patent Number: 6,027,243
[45] Date of Patent: Feb. 22, 2000

[54] PARITY CHECK CIRCUIT

[75] Inventor: Satoshi Owada, Tokyo, Japan

[73] Assignee: Oki Electric Industry Co., Ltd., Tokyo, Japan

[21] Appl. No.: 09/048,227

[22] Filed: Mar. 26, 1998

[30] Foreign Application Priority Data

Jul. 9, 1997 [JP] Japan .................................. 9-199392

[51] Int. Cl.[7] .............................. G06F 11/00; G06F 1/04
[52] U.S. Cl. .......................................... 371/49.2; 395/559
[58] Field of Search ................................. 371/49.2, 49.1, 371/49.3, 50.1, 51.1, 62; 364/266.3, 945.6; 395/555, 559

[56] References Cited

U.S. PATENT DOCUMENTS

| | | | |
|---|---|---|---|
| 3,763,470 | 10/1973 | Geng et al. ............................. | 371/49.1 |
| 3,838,393 | 9/1974 | Dao ........................................ | 371/49.2 |
| 3,891,969 | 6/1975 | Dhristensen ........................... | 371/49.2 |
| 4,183,463 | 1/1980 | Kemmetmuiller ..................... | 371/50.1 |

*Primary Examiner*—Trinh L. Tu
*Attorney, Agent, or Firm*—Rabin & Champagne, P.C.

[57] ABSTRACT

A parity check circuit for inspecting a piece of binary information having n bits including a parity bit provided with n EXCLUSIVE-OR circuits for receiving each bit of the piece of binary information, at least one stage composed of EXCLUSIVE-OR circuits having the number of a half of the previous stage until the number of the EXCLUSIVE-OR circuits reaches one, and an error detector, further including at least one data register circuit intervening between each of the stages and for receiving a set of data from the previous stage, forwarding the previous set of data which has been registered therein toward the next stage, and registering the set of data newly delivered to the stage, in response to a check signal.

12 Claims, 3 Drawing Sheets

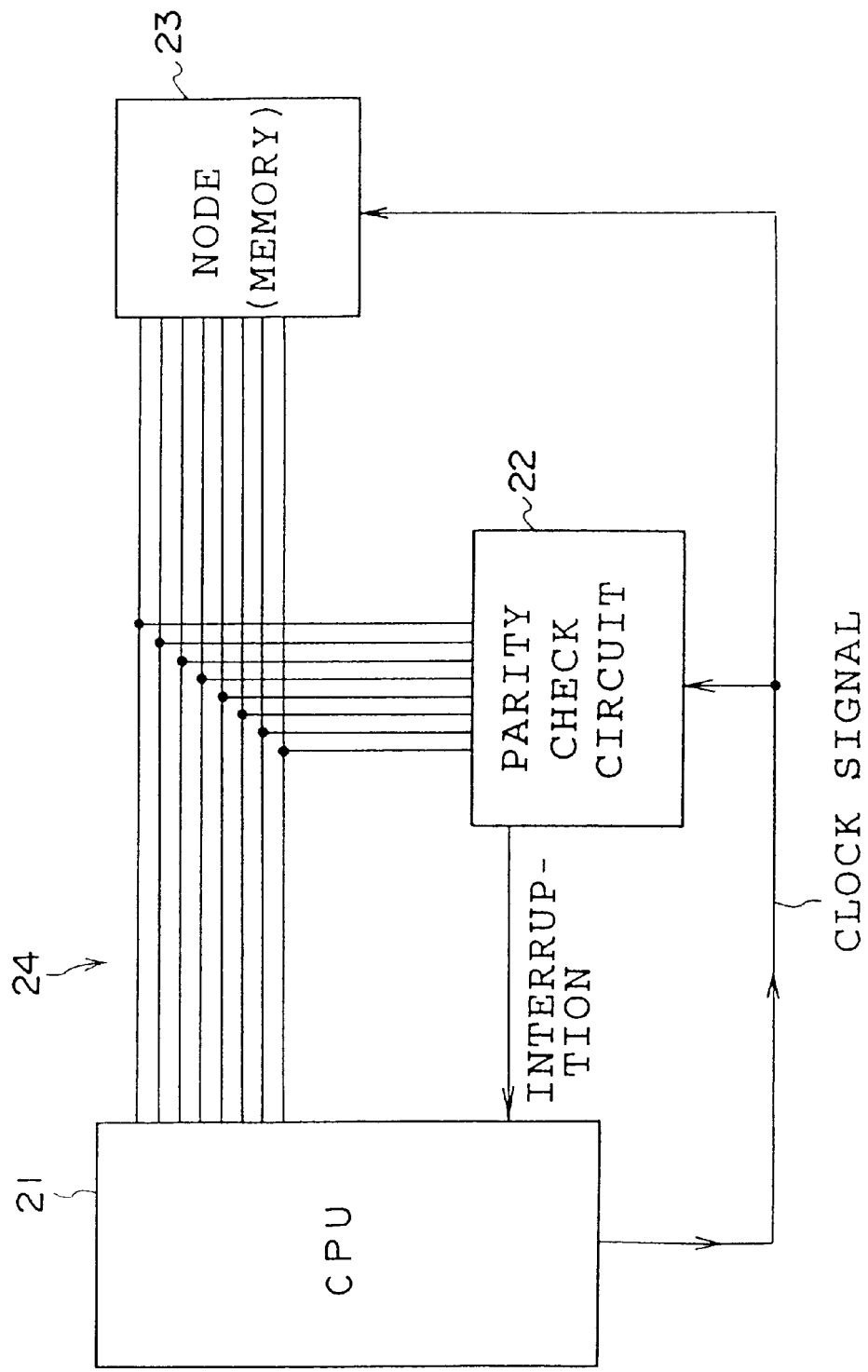

PARITY CHECK CIRCUIT

FIELD OF THE INVENTION

This invention relates to an improvement applicable to a parity check circuit. More specifically, this invention relates to an improvement developed for shortening a period required to conduct a parity check.

BACKGROUND OF THE INVENTION

A parity check circuit is a circuit employable for conducting a parity check which is defined as a test system employable for detecting a bit error of a piece of binary information which bit error has been introduced in the piece of binary information during a period in which the piece of binary information was transmitted. The parity check system is based on a concept to find a bit error by inspecting whether the cumulative number of 1s or 0s included in a transmitted piece of binary information is even or odd, on the premise that all the pieces of binary information to be transmitted are designed to have 1s and 0s of which the cumulative number is even or odd, such a numeral combination being realized by selectively adding 1 or 0 to the original piece of binary information which has the number of bits which is the final bit quantity less 1.

It is inherently difficult to entirely prohibit a bit error from occurring for a piece of binary information in a transmission line, because a bit error is readily caused by a noise picked up during a transmission period in the transmission line.

In order to secure the security of communication, a test system employable for inspecting safe delivery of a piece of binary information is essential. The parity check system is the most prevailing one developed for the purpose.

Referring to FIGS. 1 and 2, a brief description will be presented below for a parity check system and a parity check circuit available in the prior art.

Referring to FIG. 1, a parity check circuit employable for a four-bit binary information available in the prior art is composed of two EXCLUSIVE-OR circuits (1) and (2) constituting the first stage gate, an EXCLUSIVE-OR circuit (5) constituting the second stage gate and an error detector (10).

It is noted that an EXCLUSIVE-OR circuit is a gate which outputs 0, if it is inputted two same signals, namely two 1s or two 0s, and which outputs 1, if the inputted two signals are different from each other, namely e.g. one 1 and one 0. The error detector (10) has a function to output an error signal in response to an output of the EXCLUSIVE-OR circuit of the last stage. The error signals are usually designed to be outputted simultaneously with a clock signal.

Supposing the parity check circuit of FIG. 1 is designed on the basis of the even parity or on the basis that a piece of binary information has a cumulative number of 1s which is even, the gate (5) outputs 0, if the cumulative number of 1s included in an inputted piece of binary information, a combination of A, B, C and D, is even, to show the transmission was normal. And the error detector (10) does not output an error signal. On the contrary, if the cumulative number of 1s included in an inputted piece of binary information, a combination of A, B, C and D, is odd, the gate (5) outputs (1) to show the transmission was abnormal. And this error detector (10) outputs an error signal.

Referring to FIG. 2, a parity check circuit employable for a eight-bit binary information available in the prior art is composed of four EXCLUSIVE-OR circuits (1), (2), (3) and (4) constituting the first stage gate, two EXCLUSIVE -OR circuits (5) and (6) constituting the second stage, an EXCLUSIVE -OR circuit (7) constituting the third stage and an error detector (10).

The quantity of the stages can be determined employing a formula:

(Quantity of stages)=$\log_2 N$ wherein, N is the number of bits.

The more the quantity of the bits is, the more the quantity of the stages is. As a result, the time required for inspection of one piece of binary information is determined by a product of the quantity of the stages and the time required for passing through one stage. The more the quantity of the stages is, the longer the time required for inspection of one piece of binary information is. In other words, the time required for inspection of one piece of binary information increases in proportion to the quantity of the stages. Since the period of error detection is determined by the quantity of the stages, the quantity of the stages is a parameter to determine the information transmission rate for a system.

OBJECTS AND SUMMARY OF THE INVENTION

Accordingly, the object of this invention is to provide a parity check circuit which requires a less length of time for conducting inspection of one piece of binary information.

To achieve the foregoing object, a parity check circuit for inspecting a piece of binary information having n bits including a parity bit in accordance with this invention comprises:

n EXCLUSIVE-OR circuits for receiving each bit of the piece of binary information, at least one stage comprising a plurality of EXCLUSIVE-OR circuits having the number of a half of the previous stage until the number of the EXCLUSIVE-OR circuit reaches one, and an error detector, further comprising:

at least one data register circuit intervening between each of the stages and for receiving a set of data from the previous stage, forwarding the previous set of data which has been registered therein, and registering the set of data newly delivered, in response to a clock signal.

The foregoing parity check circuit can be employed for a computer system having a central processing unit, in which the foregoing clock pulses are issued by the central processing unit.

BRIEF DESCRIPTION OF THE DRAWINGS

This invention, together with its various features and advantages, can be readily understood from the following more detailed description presented in conjunction with the following drawings, in which:

FIG. 4 is a block diagram of a computer system in which the parity check circuit in accordance with one embodiment of this invention, is employed.

DETAILED DESCRIPTION OF THE PREFERRED EMBODIMENTS

Figure 1:
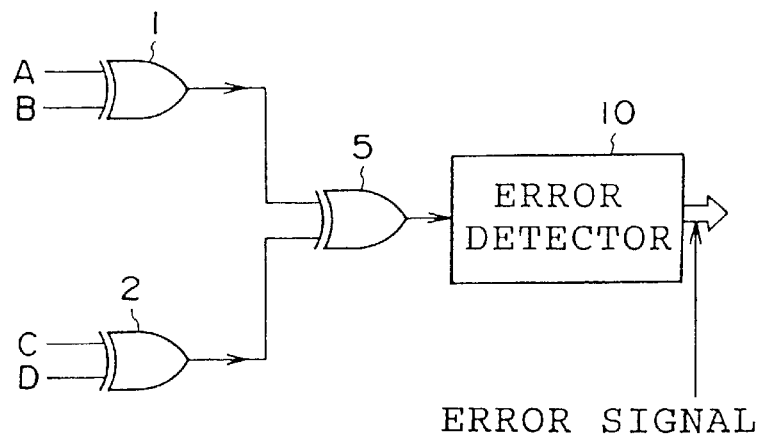
FIG. 1 is the block diagram of a parity check circuit employable for inspecting a piece of four-bit binary information available in the prior art.
Figure 2:
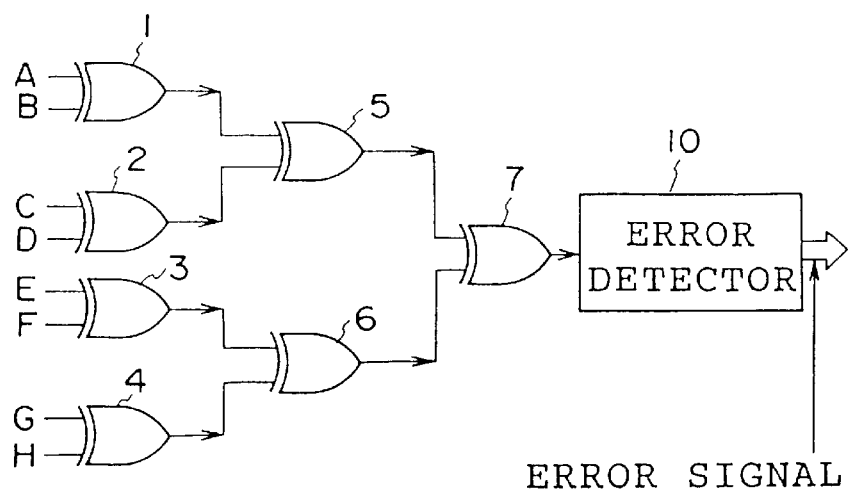
FIG. 2 is the block diagram of a parity check circuit employable for inspecting a piece of eight-bit binary information available in the prior art.
Figure 3:
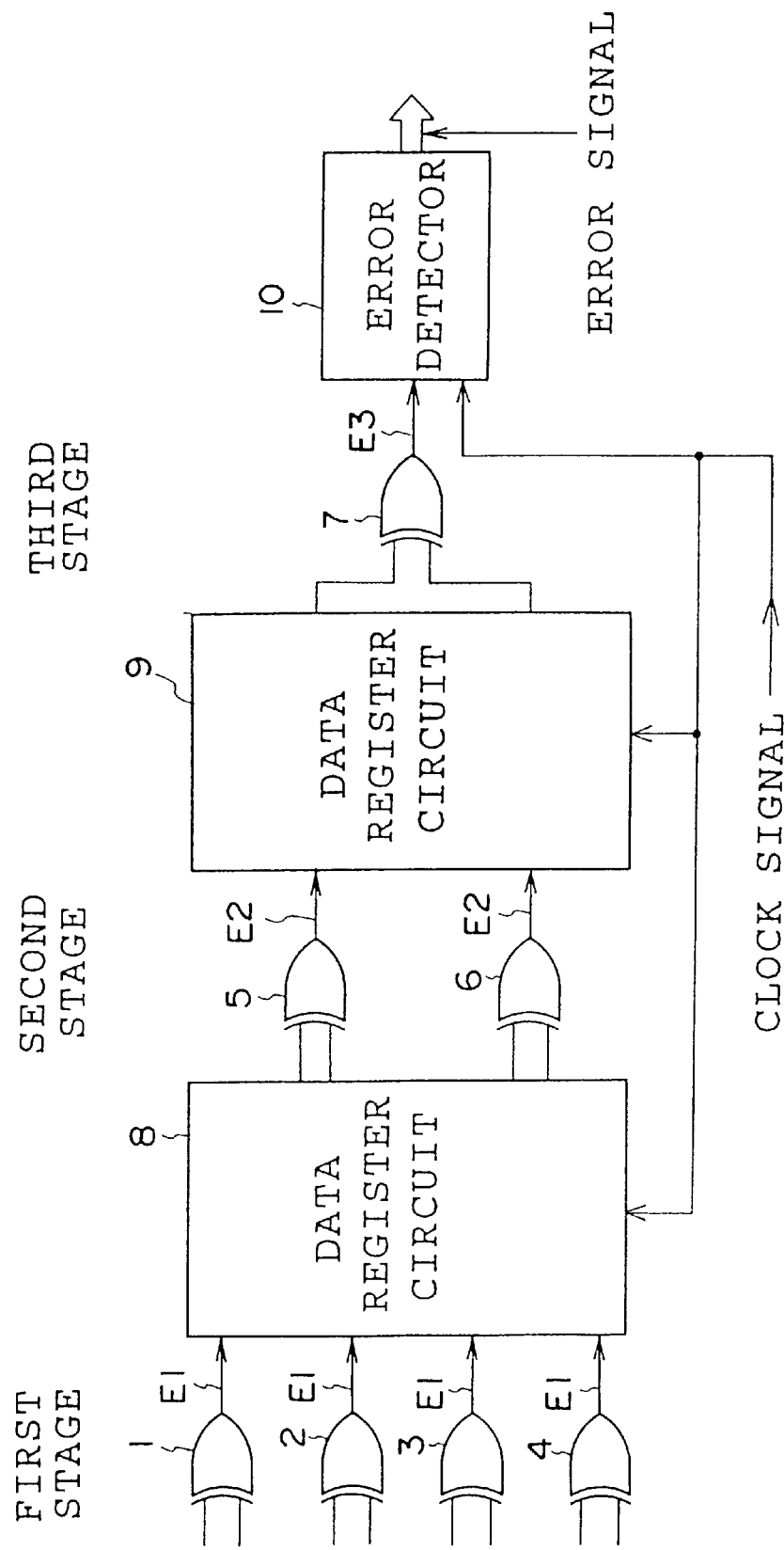
FIG. 3 is the block diagram of a parity check circuit in accordance with one embodiment of this invention.

Referring to FIG. 3, a parity check circuit in accordance with one embodiment of this invention employable for inspecting a piece of eight-bit binary information is composed of four EXCLUSIVE-OR circuits (1), (2), (3) and (4) constituting the first stage, a data register circuit (8), two EXCLUSIVE-OR circuits (5) and (6) constituting the second stage, a data register circuit (9), an EXCLUSIVE-OR circuit (7) constituting the third stage and an error detector (10).

The data register circuits (8) and (9) have a function to receive the output signal of each EXCLUSIVE-OR circuit of the previous stage, to shift or forward the set of data previously registered therein, toward the next stage, and to register a set of data newly delivered to the present stage, in response to a clock signal.

Since this system is a synchronous system, each action conducted by each component is conducted in response to a clock signal. In other words, each EXCLUSIVE-OR circuit of each stage receives each bit of a piece of binary information in response to a clock signal, each of the data register actually a shift register works in response to a clock signal and the error detector works in response to a clock signal.

As an example, the operation of this parity check circuit in accordance with one embodiment of this invention employable for a piece of 8-bit binary information will be described below.

1. Each piece of binary information having 7 bits has a parity bit (0 or 1) added to make the cumulative sum of 1s and 0s either even or odd. Resultantly making the piece of binary information have a total number of 8 bits including a parity bit.

2. Each bit of a piece of binary information having 8 bits including a parity bit is inspected in each of the input terminals of EXCLUSIVE-OR circuits (1), (2), (3) and (4).

3. Each of the EXCLUSIVE-OR circuit (1), (2), (3) and (4) spends some length of time which may be slightly different between each EXCLUSIVE-OR circuit to output the output signal ($E_1$) toward the data register circuit (8).

4. The data register circuit (8) receives the output signals ($E_1$) in response to a clock signal and shifts a previous set of data which has been registered therein to the second stage and registers the new set of data therein.

5. Each of the EXCLUSIVE-OR circuits (5) and (6) receives the output signal ($E_1$), before spending some length of time which may be slightly different between the EXCLUSIVE-OR circuit (5) and the EXCLUSIVE-OR circuit (6) to output the output signal ($E_2$) toward the data register circuit (9).

6. The data register circuit (9) receives the output signal ($E_2$) in response to a clock signal and shifts a previous set of data which was registered therein to the third stage and registers the new set of data therein.

7. The EXCLUSIVE-OR circuit 7 receives the output signal ($E_2$), before spending some length of time to output the output signal ($E_3$), toward the error detector (10).

8. The error detector (10) receives the output signal ($E_3$), in response to a clock signal, and inspects whether the output signal ($E_3$) is 1 or 0 and determines if a bit error has occurred for the piece of binary information, if it is different from the one which was set at the beginning of the series of actions.

As was described above, a parity check circuit available in the prior art does not allow a next piece of binary information to be inputted into the parity check circuit until a previous piece of binary information has passed through the parity check circuit, resultantly requiring a length of time corresponding to a product of the quantity of the stages and the time required for passing through one stage. A parity check circuit in accordance with this invention, allows a next piece of binary information to be inputted into the parity check circuit just after a previous piece of binary information has passed through the first stage, resultantly allowing one piece of information to be inputted into the parity check circuit in response to each clock signal. As a result, the number of the stages does not drive the length of time required for a piece of binary information to be conducted a parity check test. In other words, the length of time required for conducting a parity check for a piece of binary information employing a parity check circuit in accordance with this invention, has been shortened to the period of one clock signal, provided plural pieces of binary information are scheduled to be inputted in the parity check circuit in succession.

The foregoing description has clarified a parity check circuit requiring a less length of time for conducting a parity check of a piece of binary information has been successfully provided by this invention.

In addition, an exemplary computer system employing a parity check circuit in accordance with this invetion will be described below.

Referring to FIG. 4, a parity check circuit in accordance with this invention (22) intervenes between a central processing unit (21) and a node (memory) (23) by employing a plurality of buses (24).

The central processing unit (21) reads data having 8 bits stored in the node (memory) (23) through the plurality of buses (24) of which the number is 8.

The parity check circuit (22) works depending on clock signals issued by the central processing unit (21).

If a bit error is found, an interruption signal will be given to the central processing unit (21).

The parity check circuit finishes a parity check for a datum having 8 bits in a period of a clock signal. On the other hand, a parity check circuit available in the prior art requires a length of time corresponding to 3 stages for the purpose to conduct a parity check for a datum having 8 bits, resultantly making impossible to use the clock signal issued by central processing unit (21) as a clock signal which is used as a clock signal for the parity circuit (22), provided a parity check circuit available in the prior art is employed therefor.

As was described above, however, since the parity check circuit (22) requires a length of time corresponding to a time required for a piece of information to pass one stage, for the purpose to finish a parity check, the clock signal issued by the central processing unit (21) can be used as a clock signal for the parity check circuit (22). This is a remarkable advantage for composing a computer system.

The foregoing description has clarified a parity check circuit requiring a less length of time for conducting a parity check of a piece of binary information has been successfully provided by this invention.

Although this invention has been described with reference to a specific embodiment, this description is not meant to be the construed in a limiting sense. Various modifications of the disclosed embodiments, as well as other embodiments of this invention, will be apparent to persons skilled in the art upon reference to the description of this invention. It is therefore contemplated that the appended claims will cover any such modifications or embodiments as fall within the true scope of this invention.

What is claimed is:

1. A parity check circuit, comprising:
   a plurality of successive check stages, each check stage having a plurality of Exclusive-OR circuits (XORs), a plurality of input ports for receiving bits of binary data and at least one output port for providing a check stage result, wherein each successive check stage of the plurality of successive check stages has a smaller number of XORs than a previous successive check stage;
   a plurality of data register circuits interleaved between the plurality of check stages, the data register circuits having a plurality of data input ports for receiving check stage results from a previous check stage, a plurality of output ports, and a clock input port for receiving a clock signal, wherein the data register circuits are responsive to the clock signal for providing the received check stage results to a next successive check stage; and
   an error check circuit having at least one input port for receiving the check stage results of a final check stage, and an output port for providing an error signal based on the final check stage result.

2. The parity check circuit of claim 1, wherein the final check stage has only one XOR.

3. The parity check circuit of claim 1, wherein a first check stage of the plurality of check stages includes a number of XORs that is equal to half the number of input ports of the first check stage, each of the first check stage XORs receiving two distinct bits of binary data.

4. The parity check circuit of claim 3, wherein each successive check stage of the plurality of check stages has half the number of XORs of the previous successive check stage.

5. The parity check circuit of claim 4, wherein the plurality of output ports of each data register is equal in number to the plurality of input ports of a next successive check stage of the plurality of check stages.

6. The parity check circuit of claim 5, wherein each received check stage result provided by each data register circuit is provided to a distinct XOR input port of the next successive check stage.

7. A computer system, comprising:
   a central processing unit (CPU);
   a memory module; and
   a parity check circuit, including:
      a plurality of successive check stages, each check stage having a plurality of Exclusive-OR circuits (XORs), a plurality of input ports for receiving bits of binary data from the memory module and at least one output port for providing a check stage result, wherein each successive check stage of the plurality of successive check stages has a smaller number of XORs than a previous successive check stage;
      a plurality of data register circuits interleaved between the plurality of check stages, the data register circuits having a plurality of data input ports for receiving check stage results from a previous check stage, a plurality of output ports, and a CPU clock input port for receiving a clock signal, wherein the data register circuits are responsive to the CPU clock signal for providing the received check stage results to a next successive check stage; and
      an error check circuit having at least one input port for receiving the check stage results of a final check stage, and an output port for providing an error signal to the CPU based on the final check stage result.

8. The computer system of claim 7, wherein a final check stage has only one XOR.

9. The computer system of claim 7, wherein a first check stage of the plurality of check stages includes a number of XORs that is equal to half the number of input ports of the first check stage, each of the first check stage XORs receiving two distinct bits of binary data.

10. The computer system of claim 9, wherein each successive check stage of the plurality of check stages has half the number of XORs of the previous successive check stage.

11. The computer system of claim 10, wherein the plurality of output ports of each data register is equal in number to the plurality of input ports of a next successive check stage of the plurality of check stages.

12. The computer system of claim 11, wherein each received check stage result provided by each data register circuit is provided to a distinct XOR input port of the next successive check stage.

* * * * *